United States Patent
Jin et al.

(10) Patent No.: US 12,373,997 B2
(45) Date of Patent: Jul. 29, 2025

(54) VIRTUAL OBJECT DISPLAY METHOD, STORAGE MEDIUM AND ELECTRONIC DEVICE

(71) Applicant: GUANGDONG OPPO MOBILE TELECOMMUNICATIONS CORP., LTD., Guangdong (CN)

(72) Inventors: Ke Jin, Guangdong (CN); Jijunnan Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 228 days.

(21) Appl. No.: 18/313,862

(22) Filed: May 8, 2023

(65) Prior Publication Data

US 2023/0274471 A1 Aug. 31, 2023

Related U.S. Application Data

(63) Continuation of application No. PCT/CN2021/112720, filed on Aug. 16, 2021.

(30) Foreign Application Priority Data

Nov. 9, 2020 (CN) .......................... 202011241693.5

(51) Int. Cl.
  *G06T 19/00* (2011.01)
  *G06T 7/246* (2017.01)
  (Continued)

(52) U.S. Cl.
  CPC .............. *G06T 11/00* (2013.01); *G06T 7/248* (2017.01); *G06T 7/74* (2017.01); *H04S 7/303* (2013.01);
  (Continued)

(58) Field of Classification Search
  CPC ........................... G06T 19/006; G06T 13/205
  See application file for complete search history.

(56) References Cited

U.S. PATENT DOCUMENTS

| 5,513,129 A * | 4/1996 | Bolas ...................... G06F 3/011 703/13 |
| 2008/0114493 A1* | 5/2008 | Kim ....................... B25J 13/003 700/249 |

(Continued)

FOREIGN PATENT DOCUMENTS

| CN | 105073073 | 11/2015 |
| CN | 107329980 | 11/2017 |

(Continued)

OTHER PUBLICATIONS

WIPO, International Search Report and Written Opinion for PCT/CN2021/112720, Oct. 26, 2021.

(Continued)

*Primary Examiner* — Yi Yang
(74) *Attorney, Agent, or Firm* — Hodgson Russ LLP

(57) ABSTRACT

A virtual object display method, a non-transitory computer-readable storage medium and an electronic device. The virtual object display method includes operations as follows. Localization is performed on the first device to determine a pose of the first device in a target coordinate system; a pose of a second device in the target coordinate system is determined, where the second device is configured to play audio; a virtual object corresponding to the audio is determined, and a pose of the virtual object in the target coordinate system is determined based on the pose of the second device in the target coordinate system; and in response to the second device is playing the audio, the virtual object is displayed on a display interface of the first device according to the pose of the first device in the target coordinate system (Continued)

and the pose of the virtual object in the target coordinate system.

20 Claims, 9 Drawing Sheets

(51) Int. Cl.
    *G06T 7/73*      (2017.01)
    *G06T 11/00*      (2006.01)
    *G06T 13/20*      (2011.01)
    *H04S 7/00*      (2006.01)

(52) U.S. Cl.
    CPC .............. *G06T 2207/10028* (2013.01); *G06T 2210/21* (2013.01); *H04S 2400/11* (2013.01); *H04S 2400/15* (2013.01)

(56) References Cited

U.S. PATENT DOCUMENTS

| | | | | |
|---|---|---|---|---|
| 2009/0106288 | A1* | 4/2009 | Yang | H04N 21/234309 |
| 2011/0077080 | A1 | 3/2011 | Meer | |
| 2014/0193040 | A1* | 7/2014 | Bronshtein | G06T 7/246 |
| | | | | 382/107 |
| 2015/0106823 | A1* | 4/2015 | Canoy | G06F 9/505 |
| | | | | 718/105 |
| 2015/0138233 | A1* | 5/2015 | Frushour | G06T 19/006 |
| | | | | 345/633 |
| 2017/0098453 | A1* | 4/2017 | Wright | H04S 1/002 |
| 2018/0284882 | A1* | 10/2018 | Shipes | G06F 3/011 |
| 2018/0306587 | A1* | 10/2018 | Holz | B66F 9/0755 |
| 2020/0143603 | A1* | 5/2020 | Kotake | G01B 11/002 |
| 2020/0221248 | A1 | 7/2020 | Eubank et al. | |

FOREIGN PATENT DOCUMENTS

| | | |
|---|---|---|
| CN | 108769535 | 11/2018 |
| CN | 110379430 | 10/2019 |
| CN | 110401810 | 11/2019 |
| CN | 111052770 | 4/2020 |
| CN | 111273775 | 6/2020 |
| CN | 111338474 | 6/2020 |
| CN | 111459263 | 7/2020 |
| CN | 111710019 | 9/2020 |
| CN | 112233146 | 1/2021 |
| EP | 3680809 | 7/2020 |
| IN | 107992281 | 5/2018 |

OTHER PUBLICATIONS

CNIPA, Notification to Grant Patent Right for Invention for CN Application No. 202011241693.5, May 8, 2021.

Shen et al., "A system for visualizing sound source using augmented reality," Advances in Mobile Computing & Multimedia, ACM, Dec. 3, 2012.

EPO, Extended European Search Report for EP Application No. 21888236.3, Feb. 7, 2024.

* cited by examiner

VIRTUAL OBJECT DISPLAY METHOD, STORAGE MEDIUM AND ELECTRONIC DEVICE

CROSS-REFERENCE TO RELATED APPLICATIONS

This disclosure is a continuation of International Application No. PCT/CN2021/112720, filed Aug. 16, 2021, which claims priority to Chinese Patent Application No. 202011241693.5, filed Nov. 9, 2020, the entire disclosures of which are incorporated herein by reference.

TECHNICAL FIELD

The disclosure relates to the field of augmented reality technologies, and particularly to a virtual object display method, a computer-readable storage medium, and an electronic device.

BACKGROUND

Sound, as an important way of information transmission, brings people with convenience of communication, pleasure of enjoying music, and warnings when encountering dangers. However, the human auditory organs can only distinguish a type of sound in a fixed frequency band, and the information transmission will be limited if the sound is limited to auditory perception. With the development of various technologies, sound visualization has become an object of people's pursuit.

At present, the sound visualization is still limited to a presentation using a real object's motion, its visualization effect is poor and thus cannot accurately reflect information conveyed by the sound, and moreover there is a requirement for cooperation of the real object, which is costly.

SUMMARY

According to an aspect of the disclosure, a virtual object display method implemented by a first device is provided. The method includes: performing localization on the first device to determine a pose of the first device in a target coordinate system; determining a pose of a second device in the target coordinate system in which the second device is configured to play audio; determining a virtual object corresponding to the audio, and determining, based on the pose of the second device in the target coordinate system, a pose of the virtual object in the target coordinate system; and in response to the second device is playing the audio, displaying, according to the pose of the first device in the target coordinate system and the pose of the virtual object in the target coordinate system, the virtual object on a display interface of the first device.

According to another aspect, a non-transitory computer storage medium is provided. The computer storage medium is stored with a computer program, wherein the computer program is configured to be executed by a processor to implement operations as follows. Localization is performed on the first device to determine a pose of the first device in a target coordinate system. A pose of a second device in the target coordinate system is determined, where the second device is configured to play audio. A virtual object corresponding to the audio is determined, and a pose of the virtual object in the target coordinate system is determined based on the pose of the second device in the target coordinate system. According to the pose of the first device in the target coordinate system and the pose of the virtual object in the target coordinate system, the virtual object is displayed in an augmented reality environment on a display interface of the first device when the second device is playing the audio.

According to still another aspect, an electronic device is provided. The electronic device includes a processor and a memory. The memory is configured to store one or more programs, wherein the one or more programs are configured to, when executed by the processor, cause the processor to implement operations as follows. A pose of the first device and a pose of a second device in a target coordinate system are determined, in which the second device is configured to play audio. A virtual object corresponding to the audio is determined, and a pose of the virtual object in the target coordinate system is determined based on the pose of the second device in the target coordinate system. In response to the second device is playing the audio, the virtual object is displayed on a display interface of the first device, according to the pose of the first device in the target coordinate system and the pose of the virtual object in the target coordinate system.

DETAILED DESCRIPTION OF EMBODIMENTS

Figure 1:
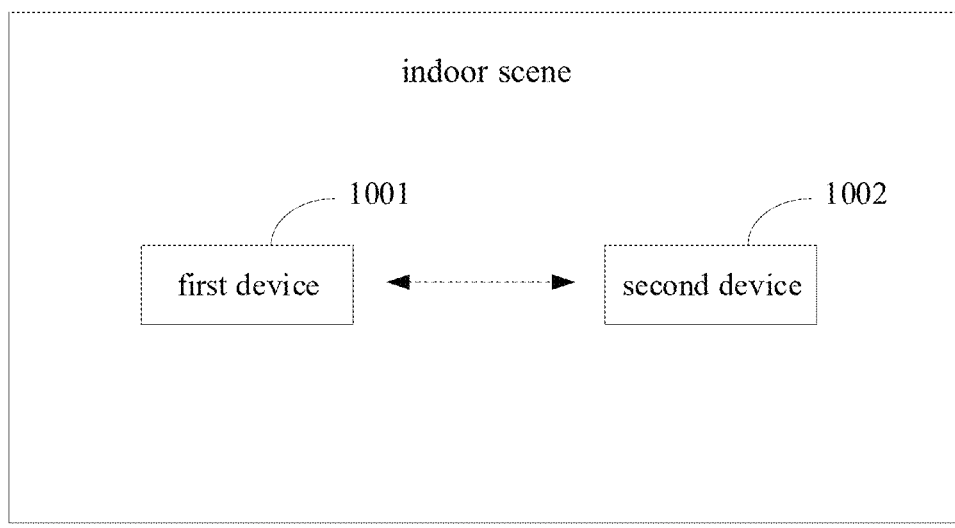
FIG. 1 illustrates a schematic diagram of an exemplary system architecture of a virtual object display solution according to some embodiment of the disclosure.

Exemplary embodiments will now be described more comprehensively with reference to the drawings. However, the exemplary embodiments may be implemented in various forms and should not be understood as limited to the examples described herein. Rather, the embodiments are provided to make the disclosure more comprehensive and complete, and fully convey the concept of the exemplary embodiments to those skilled in the art. The features, structures or characteristics described can be combined in one or more embodiments in any suitable manner. In the following description, many specific details are provided to offer a full understanding of the embodiments of the disclosure However, those skilled in the art will appreciate that, it is possible to practice the technical schemes of the disclosure while omitting one or more of the particular details described, or other methods, components, apparatuses, operations, etc. may be employed to practice the technical schemes of the disclosure. In other instances, the well-known technical solutions are not shown or described in detail, to avoid providing too much noisy information and obscuring aspects of the disclosure.

In addition, the accompanying drawings are only schematic illustrations of the disclosure and are not necessarily drawn to scale. Identical references in the drawings indicate identical or similar parts, and thus repetitive descriptions thereof will be omitted. Some of the block diagrams shown in the accompanying drawings are functional entities, and do not necessarily correspond to physically or logically independent entities. These functional entities may be implemented in the form of software, in one or more hardware modules or in integrated circuits, or in different networks and/or processor apparatuses and/or micro-control apparatuses.

The flowcharts shown in the accompanying drawings are only exemplary illustrations and do not have to include all of the operations. For example, some operations may be split, while other operations may be combined or partly combined, thus the actual execution order may be changed depending on actual situations. In addition, all the terms "first" and "second" below are merely used for the purpose of distinction, and should not be used as a limitation to the disclosure.

FIG. 1 illustrates a schematic diagram of an exemplary system architecture of a virtual object display solution according to some embodiment of the disclosure.

As illustrated in FIG. 1, an indoor scene includes a first device 1001 and a second device 1002. A virtual object corresponding to audio played by the second device 1002 may be presented on a display interface of the first device 1001. As such, sound visualization is realized, or a presentation of the virtual object can facilitate an expression of audio content.

The first device 1001 may be a device capable of implementing AR processing and AR display functions, such as a mobile phone, a tablet computer, augmented reality (AR) glasses, or an AR helmet. The second device 1002 is a device for playing audio, which may be a speaker, a mobile phone, a tablet computer, a personal computer, a radio, and the like. The disclosure does not limit types of the first device 1001 and the second device 1002. For example, the first device 1001 may be a mobile phone, and the second device 1002 may be a speaker in some practical scenarios. In some other practical scenarios, both the first device 1001 and the second device 1002 may be mobile phones.

When implementing the display of the virtual object associated with the audio, the first device 1001 may localize itself to determine a pose of the first device 1001 in a target coordinate system. In addition, the first device 1001 may determine a pose of a second device 1002 in the target coordinate system.

The target coordinate system in the disclosure may be a coordinate system of the first device 1001 for localizing itself, a coordinate system of a mapping device for previously constructing a scene map, or a coordinate system of the second device 1002 for localizing itself. It can be understood that the first device 1001 usually needs to use the pre-constructed scene map to complete the localization. The disclosure does not limit which coordinate system the target coordinate system is directed to, as long as the determined poses can be unified in the same coordinate system.

The first device 1001 may determine a virtual object corresponding to the audio, and determine, based on the pose of the second device 1002 in the target coordinate system, a pose of the virtual object in the target coordinate system. The first device 1001 may determine the virtual object corresponding to the audio when the second device 1002 plays the audio. Alternatively, the first device 1001 may determine the virtual object before the second device 1002 plays the audio. The disclosure is not limited to the examples.

After determining the poses of the first device 1001 and the virtual object in the target coordinate system, the virtual object may be rendered on the display interface of the first device 1001 when the second device 1002 plays the audio.

It should be noted that, in some embodiments, data may be transmitted between the first device 1001 and the second device 1002. For example, the first device 1001 may send the audio to the second device 1002 and control the second device 1002 to play the audio. For another example, in some scenarios where the second device 1002 stores a virtual object corresponding to the audio, the second device 1002 may send the virtual object to the first device 1001.

In other embodiments, there is no data transmission between the first device 1001 and the second device 1002. For example, the first device 1001 may receive the audio played by the second device 1002 through a sound pickup device equipped by the first device 1001, analyze the audio, generate a corresponding virtual object according to an analysis result, and render the virtual object on the interface. And the second device 1002 is only configured to play the audio.

The disclosure also does not limit the virtual object. For example, the virtual object may be a wave that represents sound, specifically a colored wave. The display result presented on the interface of the first device 1001 may be a wave spreading around the second device 1002 with the second device 1002 as a center. For another example, the virtual object may be a virtual picture, a virtual animation, a virtual cartoon character, a virtual video, etc. that correspond to the content expressed by the audio. For another example, when the second device 1002 plays a song, the virtual object may also be a virtual image of a singer who sings the song.

The various operations of the virtual object display method described below are applied to the first device. In other words, the respective operations of the virtual object display method are executed by the first device. In this case, a virtual object display apparatus may be configured in the first device.

Figure 2:
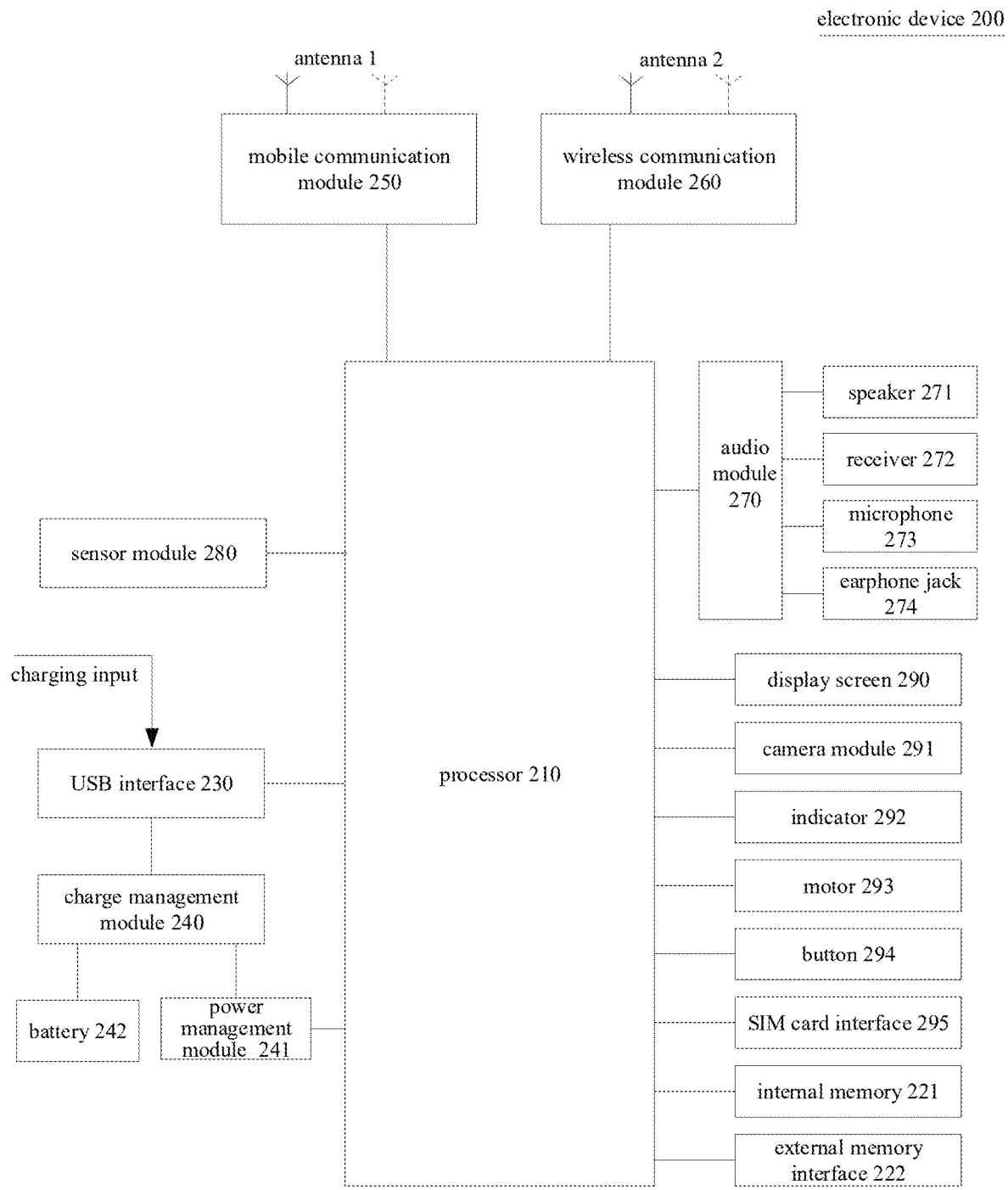
FIG. 2 illustrates a schematic structural diagram of an electronic device for implementing some embodiments of the disclosure.

FIG. 2 illustrates a schematic structural diagram of an electronic device for implementing the embodiments of the disclosure. At least the first device of the first device and/or the second device in the exemplary embodiment of the disclosure may be configured in the form illustrated in FIG. 2. It should be noted that, the electronic device illustrated in FIG. 2 is only an example, and should not impose any limitations on the functionalities and scopes of application of the embodiments of the disclosure.

The electronic device in the disclosure may at least include a processor and a memory. The memory is configured to store one or more programs. When the one or more programs are executed by the processor, the processor can be enabled to implement the virtual object display method of exemplary embodiments of the disclosure.

Specifically, as illustrated in FIG. 2, the electronic device 200 may include: a processor 210, an internal memory 221, an external memory interface 222, a universal serial bus (USB) interface 230, a charge management module 240, a power management module 241, a battery 242, an antenna 1, an antenna 2, a mobile communication module 250, a wireless communication module 260, an audio module 270, a speaker 271, a receiver 272, a microphone 273, an earphone jack 274, a sensor module 280, a display screen 290, a camera module 291, an indicator 292, a motor 293, a button 294 and a subscriber identification module (SIM) card interface 295, etc. The sensor module 280 may include a depth sensor, a pressure sensor, a gyroscope sensor, a barometric sensor, a magnetic sensor, an acceleration sensor, a distance sensor, an optical proximity sensor, a fingerprint sensor, a temperature sensor, a touch sensor, an ambient light sensor and a bone conduction sensor, etc.

It should be appreciated that, the structure illustrated in embodiments of the disclosure does not constitute specific limitations to the electronic device 200. In some other embodiments of the disclosure, the electronic device 200 may include more or fewer components than those illustrated in the figures, a combination of certain components, split parts of certain components or a different arrangement of components. The illustrated components may be implemented as hardware, software, or a combination of software and hardware.

The processor 210 may include one or more processing units. For example, the processor 210 may include an application processor (AP), a modem processor, a graphics processing unit (GPU), an image signal processor (ISP), a controller, a video codec, a digital signal processor (DSP), a baseband processor, and/or a neural-network processing unit (NPU). Among these processing units, different processing units may be independent devices or integrated in one or more processors. In addition, a memory may be provided in the processor 210 for storing instructions and data.

The electronic device 200 may implement the image or video shooting function through the ISP, the camera module 291, the video codec, the GPU, the display 290 and the application processor. In some embodiments, the electronic device 200 may include 1 or N camera modules 291, and N is a positive integer greater than 1. When the electronic device 200 includes N cameras, one of the N cameras serves as a primary camera.

The internal memory 221 may be configured to store computer executable program code. The executable program code includes instructions. The internal memory 221 may include a program storage area and a data storage area. The external memory interface 222 may be configured to connect an external memory card, such as a Micro SD card, to enable expansion of a storage capacity of the electronic device 200.

With regard to the virtual object display solution described in the disclosure, the first device may use the camera module 291 to capture a current frame, and determine depth information corresponding to the current frame based on the depth sensor in the sensor module 280. The processor 210 may determine the pose of the first device in the target coordinate system based on combining the current frame and the depth information corresponding to the current frame with pre-constructed map information. The processor 210 may also obtain the pose of the second device in the target coordinate system from the second device through the communication module. Further, the processor 210 may determine the virtual object corresponding to the audio played by the second device, and determine the pose of the virtual object in the target coordinate system according to preset a relative pose relationship between the virtual object and the second device. When the poses of the first device and the virtual object in the target coordinate system are obtained, the processor 210 may display the virtual object on the display interface of the first device when the second device plays the audio, so that the virtual object can be visible to the user through the display 290, which enables the sound visualization.

A non-transitory computer-readable storage medium may be further provided in the disclosure. The computer-readable storage medium may be included in the electronic device described in the above embodiments. Alternatively, the computer-readable storage medium may be separately provided and not assembled into the electronic device.

The computer-readable storage medium may be, for example but not limited to—electrical, magnetic, optical, electro-magnetic, infrared, or semiconductor systems, apparatuses or devices, or any combination thereof. More specific examples of the computer-readable storage medium may include, but be not limited to: an electrical connection with one or more conducting wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic memory device, or any suitable combination thereof. In the disclosure, the computer-readable storage medium may be any tangible medium that includes or stores a program. The program may be used by or used in combination with an instruction executing system, an apparatus or a device.

The computer-readable storage medium may send, transmit, or transfer programs for being used by or in conjunction with an instruction executing system, an apparatus or a device. The program code included on the computer-readable storage medium may be transmitted by any suitable medium, including but being not limited to: a wireless medium, an electric wire, an optical cable an RF, etc., or any suitable combination thereof.

The computer-readable storage medium carries one or more programs. When the one or more programs are executed by an electronic device, the electronic device is caused to implement the method as described in the following embodiments.

The flowcharts and block diagrams in the accompanying drawings illustrate the system architectures, functionalities and operations that are possible to be realized according to the systems, methods and computer program products according to various embodiments of the disclosure. In this regard, each block in the flowchart or the block diagram may represent a module, a program segment, or a portion of codes. The aforementioned module, program segment or portion of codes includes one or more executable instructions for implementing a specified logical function. It should also be noted that, in some implementations as alternatives, the functions indicated in the blocks may also occur in an order different than that indicated in the accompanying drawings. For example, two blocks represented one after another may actually be executed substantially concurrently, or sometimes they may be executed in a reverse order. The actual order may depend on the function involved. It should also be noted that, each block in a block diagram or a flowchart, and the combination of blocks in the block diagram or the flowchart, may be implemented with a dedicated hardware-based system that performs a specified function or operation, or may be implemented by a combination of a dedicated hardware and computer instructions.

The units described and involved in the embodiments of the disclosure may be implemented by software or hardware, and the units described may also be arranged in a processor. In some cases, the names of these units do not impose a limitation to the unit itself.

Figure 3:
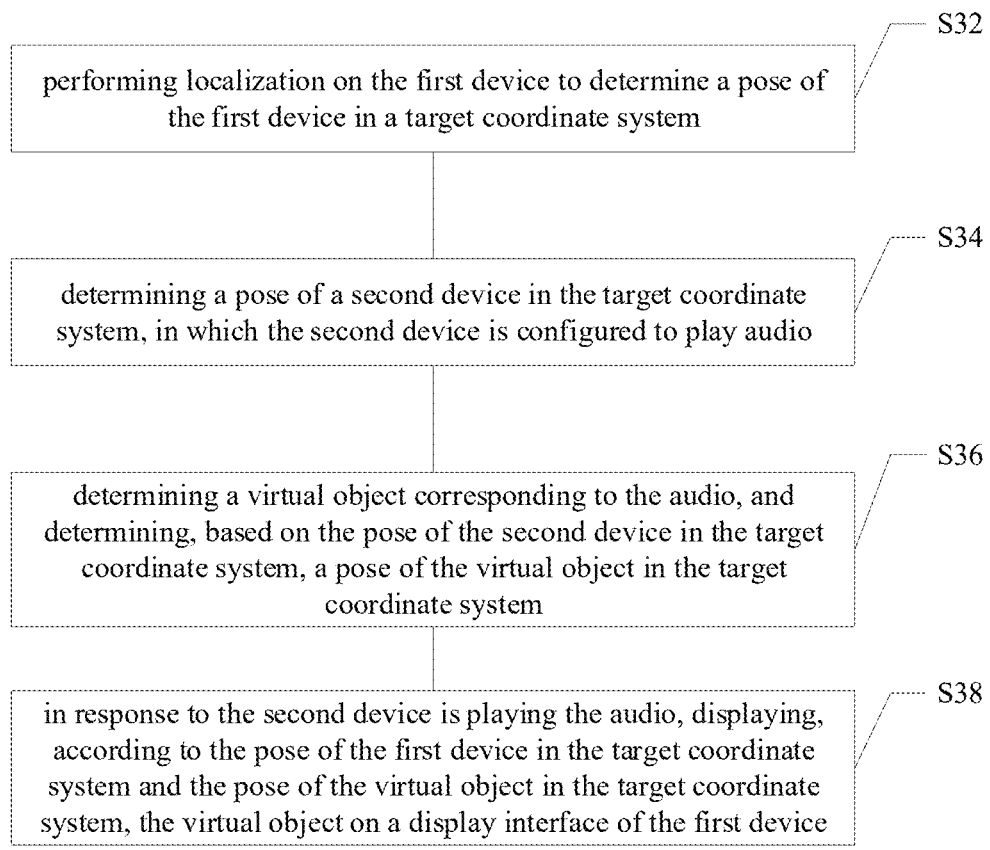
FIG. 3 illustrates a schematic flowchart of a virtual object display method according to some exemplary embodiments of the disclosure.

FIG. 3 illustrates a flowchart of a virtual object display method according to some exemplary embodiments of the disclosure. As illustrated in FIG. 3, the virtual object display method may include operations as follows.

At S32, performing localization on the first device to determine a pose of the first device in a target coordinate system.

In an exemplary embodiment of the disclosure, the term "localization" may be understood as determining a pose of a device in a scene. It should be noted that there are differences in the poses of the same object in the same scene in different coordinate systems.

With regard to the process of performing localization on the first device, a map of the scene may be constructed in advance, and the first device is localized according to the constructed map in the disclosure.

Figure 4:
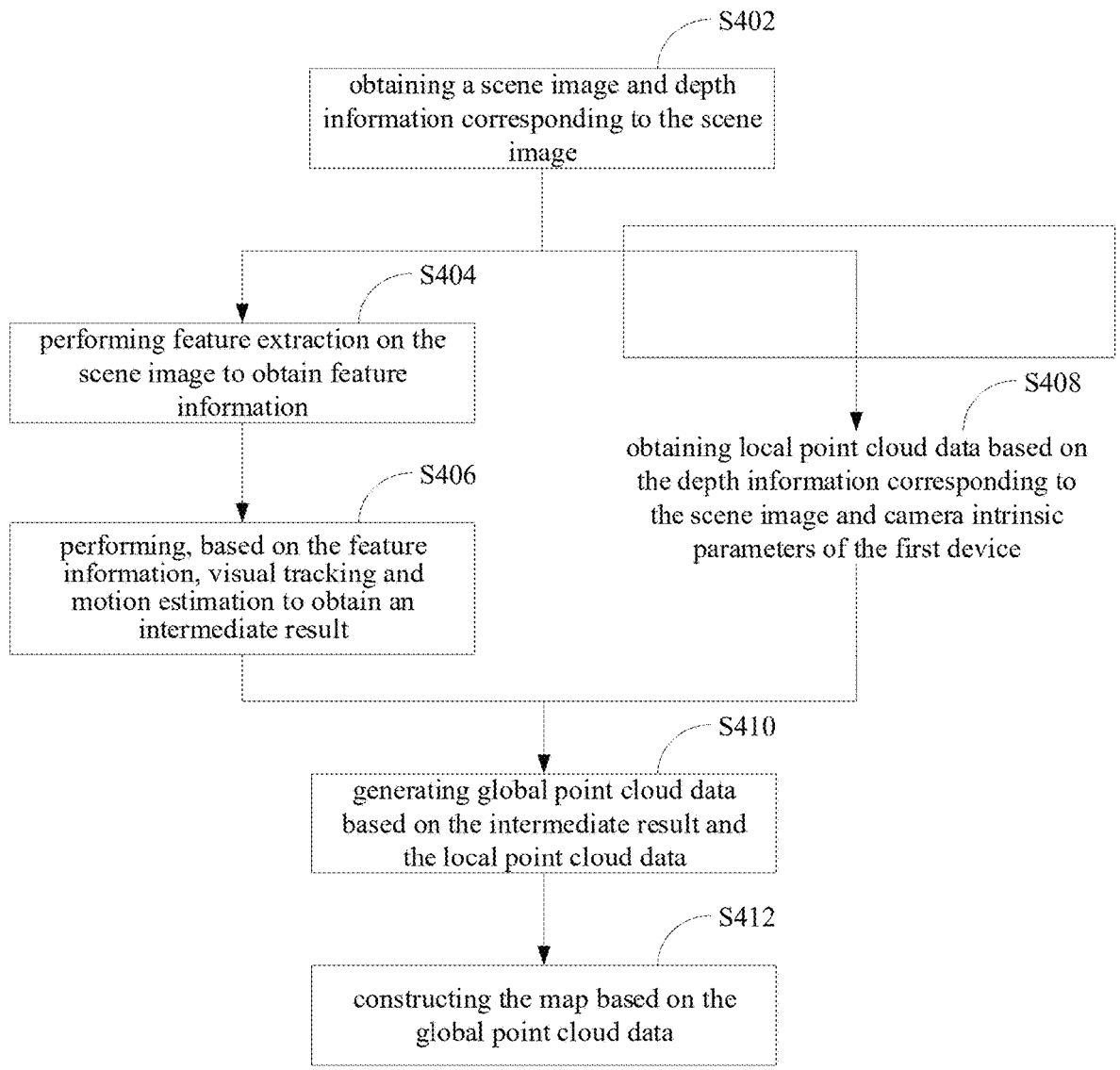
FIG. 4 illustrates a schematic flowchart of a map construction process according to some exemplary embodiments of the disclosure.

The map construction process of the exemplary embodiment of the disclosure will be described below with reference to FIG. 4. In the following examples, the device used to construct the map is referred to as a mapping device. It should be noted that the mapping device may generally be another device in addition to the first device and the second device. However, the first device may be the mapping device in the scenario where the first device maps by itself and performs relocalization. In addition, the second device may also be the mapping device when the second device is a device capable of implementing AR algorithms, such as a mobile phone or a tablet.

At S402, the mapping device obtain a scene image and depth information corresponding to the scene image.

The mapping device is equipped with a monocular camera, which can collect an environment through the monocular camera to obtain a scene image. The scene image is usually in a form of an RGB image. Specifically, the mapping device may use a monocular camera to collect RGB images at a fixed frame rate to obtain a scene image.

The mapping device is equipped with a depth sensor. The mapping device can use the depth sensor to capture depth information of the environment at a fixed frame rate to obtain a depth image. The depth sensor may adopt time of flight (TOF), structured light, and the like. In addition, the mapping device may also determine the depth information by monocular ranging or multi-visual ranging, etc., which is not limited in the disclosure.

After the RGB scene image and the depth image are obtained, the RGB scene image and the depth image may be aligned based on a timestamp, and thereby the scene image and depth information corresponding to the scene image are obtained.

At S404, the mapping device performs feature extraction on the scene image to obtain feature information.

Feature extraction algorithms of the exemplary embodiments of the disclosure may include, but are not limited to, features from accelerated segment test (FAST) feature point detection algorithm, a difference-of-gaussian (DOG) feature point detection algorithm, a Harris feature point detection algorithm, a scale invariant feature transform (SIFT) feature point detection algorithm, a speed up robust feature (SURF) feature point detection algorithm, and the like. Corresponding feature descriptors may include, but are not limited to, binary robust independent elementary features (BRIEF) feature point descriptors, binary robust invariant scalable keypoints (BRISK) feature point descriptors, fast retina keypoint (FREAK) feature point descriptors, and the like. This disclosure is not limited to these examples.

The above feature extraction algorithm and feature descriptor may be combined to determine a feature extraction mode. The determined feature extraction mode may be applied to perform the feature extraction on the scene image to obtain the feature information.

In addition, different feature extraction algorithms and feature descriptors may be combined to determine various feature extraction modes. For example, the feature extraction mode may be a combination of the FAST feature point detection algorithm and the BRIEF feature point descriptor, or a combination of the DOG feature point detection algorithm and the FREAK feature point descriptor. Based on the above description, those skilled in the art can understand that types of feature points extracted by applying different feature extraction modes on a same image are different. For example, the feature extraction mode is suitable for the feature extraction on a strong texture scene, while another feature extraction mode is suitable for the feature extraction on a weak texture scene.

In this case, various types of feature information may be extracted from the scene image based on the various feature extraction modes.

At S406, the mapping device perform, based on the feature information, visual tracking and motion estimation to obtain an intermediate result.

It is readily understood by those skilled in the art that the two-dimensional feature data represented by the captured scene image may be reflected by the visual tracking and the motion estimation, and such RGB-based two-dimensional feature data is taken as an intermediate result.

At S408, the mapping device obtains local point cloud data based on the depth information and camera intrinsic parameters of the first device. It can be understood that the local point cloud data described here is local dense point cloud data.

Figure 5:
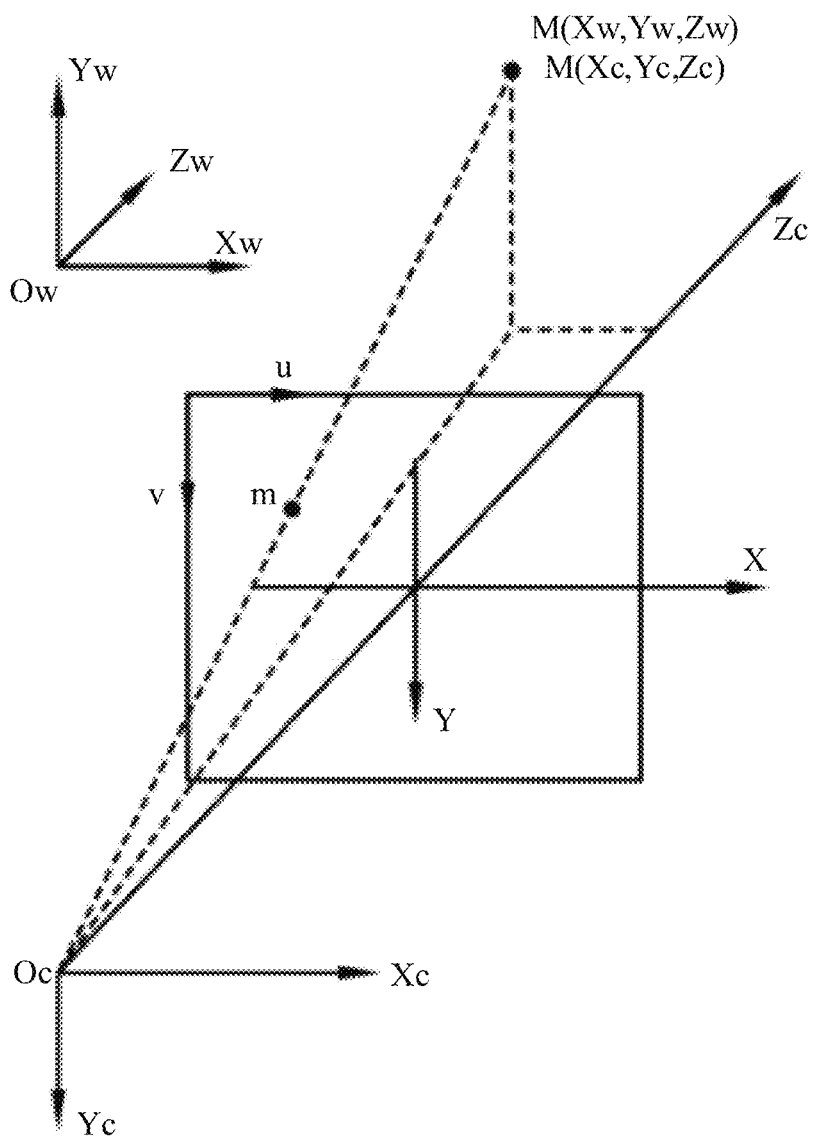
FIG. 5 illustrates a schematic diagram of a principle of pinhole imaging.

The local point cloud data may be obtained based on a principle of pinhole imaging. FIG. 5 illustrates a schematic diagram of the principle of the pinhole imaging.

Specifically, an image coordinate point (u, v) may be converted to a world coordinate point ($x_w$, $y_w$, $z_w$) by equation 1:

$$z_c \begin{pmatrix} u \\ v \\ 1 \end{pmatrix} = \begin{bmatrix} \frac{f}{dx} & 0 & u_0 \\ 0 & \frac{f}{dy} & v_0 \\ 0 & 0 & 1 \end{bmatrix} [R \ T] \begin{bmatrix} x_w \\ y_w \\ z_w \\ 1 \end{bmatrix} \quad \text{(Equation 1)}$$

In the equation 1, ($u_0$, $v_0$) represents a coordinate point of an image center, $z_c$ represents a z-axis value of a camera coordinate, $$\frac{f}{dx}$$

represents a focal length component of a focal length f on an x-axis of the camera coordinate system, $$\frac{f}{dy}$$

represents a local length component of a focal length f on an y-axis of the camera coordinate system, R and T represent a rotation matrix and a translation matrix of an external parameter matrix respectively. In the process of constructing the map, origins of a world coordinate system and the camera coordinate system are coincided, that is, there is no rotation and translation. In addition, the same object in the camera coordinate system and the world coordinate system has the same depth, that is, $z_c=z_w$. In this case, a conversion formula as equation 2 can be obtained:

$$\begin{cases} x_w = z_c \cdot (u - u_0) \cdot dx/f \\ y_w = z_C \cdot (v - v_0) \cdot dy/f \\ z_w = z_c \end{cases}$$ (Equation 2)

As such, by using the conversion relationship, the local point cloud data can be obtained based on the depth information and the camera intrinsic parameter of the first device.

At S410, the mapping device generates global point cloud data based on the intermediate result and the local point cloud data. It can be understood that the global point cloud data described here is global dense point cloud data.

Specifically, the intermediate result representing the RGB two-dimensional feature data may be combined with the local point cloud data to generate global point cloud data.

At S412, the mapping device constructs the map based on the global point cloud data.

Specifically, the global point cloud data may be serialized and stored locally to obtain a map. In addition, the constructed map may be uploaded to a cloud server, so that the could server can be used to localize the device that needs localization. It should be understood that the constructed map is a three-dimensional map containing depth information. However, in other disclosed embodiments, the constructed map may alternative not include depth information.

When the three-dimensional map of the scene is constructed, the first device may be located based on the map.

First, the first device may obtain a current frame and depth information corresponding to the current frame to obtain feature point information of the current frame. The current frame is a current image captured by the first device through its camera module, while the depth information is obtained through the depth sensor and therefore the obtained feature point information of the current frame is three-dimensional. In addition, feature point extraction used here is similar to the method for extracting feature points by the mapping device, and details are not repeated here.

The first device calculates, based on the feature point information of the current frame and feature point information of a keyframe in a keyframe set of map construction, a pose transformation relationship between a coordinate system of the first device and the coordinate system of the mapping device.

Then, the first device obtains a pose of the first device in the coordinate system of the first device, and may convert, based on the pose transformation relationship, the pose of the first device in the coordinate system of the first device to the pose of the first device in the target coordinate system.

The target coordinate system in this disclosure may be the coordinate system of the first device for localizing the first device, the coordinate system of the mapping device for constructing the scene map in advance, or the coordinate system of the second device for localizing the second device. The disclosure is not limited to these examples.

Specifically, the localization process may be implemented based on the iterative closest point (ICP) algorithm. The ICP algorithm is an optimal registration algorithm based on the least square method. When the algorithm is applied to select a corresponding point and calculate the optimal rigid body transformation repeatedly, until a convergence accuracy requirement of the correct registration is met. A basic principle of the ICP algorithm is to find, according to a certain constraint (which may be customized), closest points ($p_i$, $q_i$) in to-be-matched target point cloud P and source point cloud Q respectively, and then calculate an optimal rotation matrix R and a translation matrix T that minimizes an error function. The error function E(R,T) is shown in equation 3:

$$E(R, T) = \frac{1}{n}\sum_{i=1}^{n} \|q_i - (Rp_i + T)\|^2$$ (Equation 3)

In the equation 3, n represents the number of closest point pairs, $p_i$ is a point in the target point cloud P, and $q_i$ is the closest point corresponding to $p_i$ in the source point cloud Q.

Figure 6:
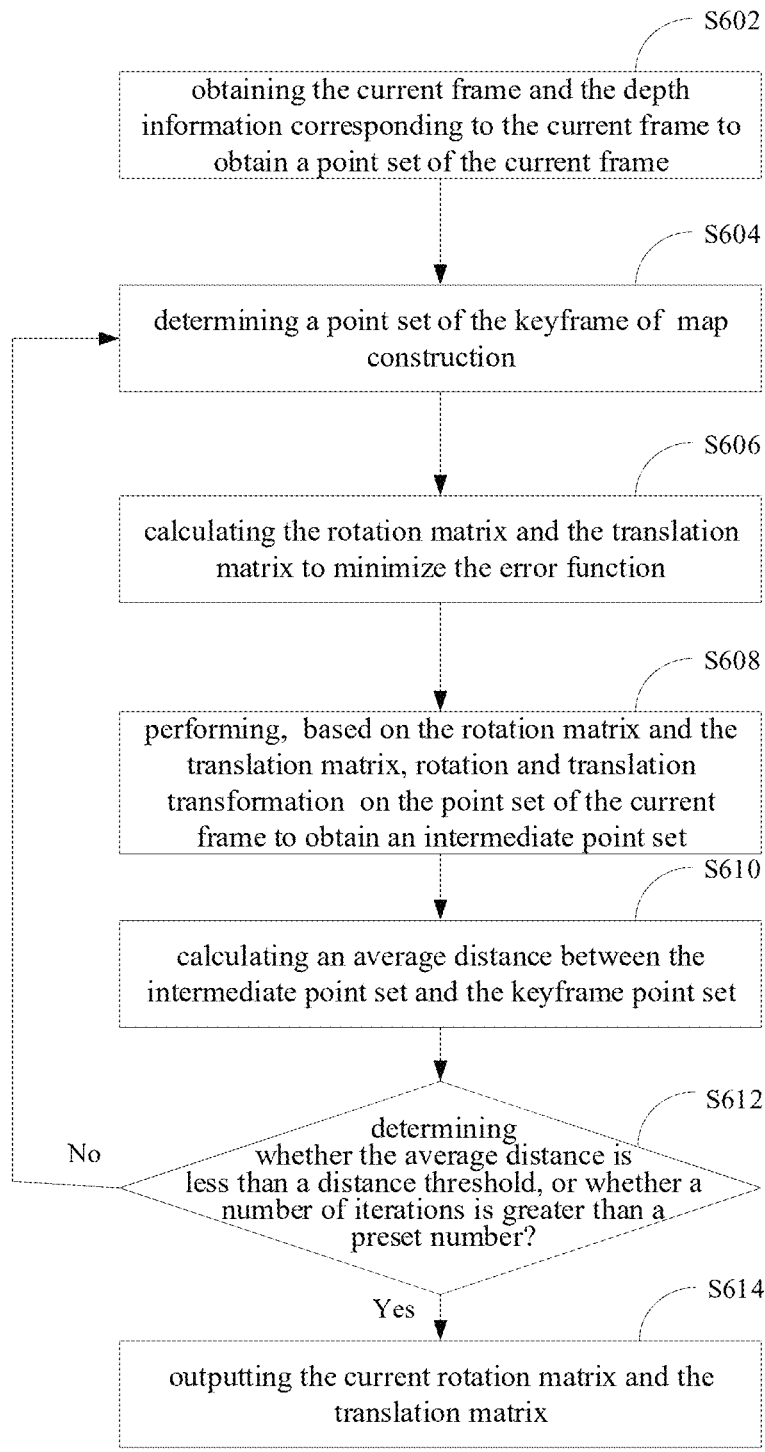
FIG. 6 illustrates a schematic flowchart of a localization process of a first device according to some exemplary embodiments of the disclosure.

A localization process of the first device according to some exemplary embodiments of the present disclosure will be described below with reference to FIG. 6.

At S602, the first device obtains the current frame and the depth information corresponding to the current frame to obtain a point set of the current frame. The following processing uses the point set $p_i \in P$, P represents the target point cloud, i.e., all the point cloud data of the current frame.

At S604, the first device determines a point set $q_i$ of the keyframe of map construction, where $q_i \in Q$, Q is the source point cloud, i.e., point cloud data of the entire map.

At S606, the rotation matrix R and the translation matrix T are calculated to minimize the error function.

At S608, rotation and translation transformation are performed, based on the rotation matrix R and the translation matrix T, on the point set $p_i$ of the current frame to obtain an intermediate point set $p'_i = \{p'_i = Rp_i + T, p_i \in P\}$.

At S610, an average distance $$d = \frac{1}{n}\sum_{i=1}^{n} \|p'_i - q_i\|^2$$

between the intermediate point set $p'_i$ and the keyframe point set $q_i$ is calculated.

At S612, it is determined whether the average distance d is less than a distance threshold $d_{TH}$, or whether a number of iterations is greater than a preset number. When it is determined that the average distance d is less than the distance threshold $d_{TH}$ or the number of iterations is greater than the preset number, S614 is performed; otherwise, S604 is returned to process another keyframe.

At S614, the current rotation matrix R and the translation matrix T are output.

As such, the first device can convert, based on the currently output rotation matrix R and translation matrix T, the pose of the first device in the coordinate system of the first device to the pose of the first device in the target coordinate system.

At S34, determining a pose of a second device in the target coordinate system, in which the second device is configured to play audio.

It should be understood that the operation of determining the pose of the second device in the target coordinate system may be performed while the second device is playing the audio. It may alternatively be performed before the second device plays the audio, that is, the second device plays the audio after the pose of the second device in the target coordinate system is determined.

According to some embodiments of the disclosure, the second device may determine the pose of the second device in the coordinate system of the second device based on Bluetooth localization or Wi-Fi localization. In some examples, the coordinate system of the second device may be understood as the world coordinate system.

Then, the second device may send the pose of the second device in the coordinate system of the second device to the first device. The first device may convert, based on a pose transformation relationship between the target coordinate system and the coordinate system of the second device, the pose of the second device in the coordinate system of the second device to obtain the pose of the second device in the target coordinate system.

The pose transformation relationship between the target coordinate system and the coordinate system of the second device may be determined in advance by coordinate alignment. For example, multiple marker points are selected, and the positions of these marker points in the target coordinate system and the coordinate system of the second device are determined manually. A mapping is established through the corresponding relationship between these positions, that is, pose transformation relationship between the target coordinate system and the coordinate system of the second device can be obtained.

According to some other embodiments of the disclosure, the second device has a function of executing an AR algorithm. In this case, the second device may perform a localization process similar to the localization process performed by the first device described above, thereby determining the pose of the second device in the target coordinate system. Subsequently, the second device may send the determined pose of itself in the target coordinate system to the first device.

Alternatively, the first device may obtain an image containing the second device and distance information (i.e., depth information) of the second device relative to the first device, analyze the image and the distance information combined with the pose of the first device in the target coordinate system to determine the pose of the second device in the target coordinate system. That is, the first device may determine the pose of the second device in the target coordinate system by itself without receiving information from the second device.

At S36, determining a virtual object corresponding to the audio, and determining, based on the pose of the second device in the target coordinate system, a pose of the virtual object in the target coordinate system.

In the exemplary embodiments of the disclosure, the audio may be various types of sounds, such as voice, music, and the disclosure does not limit the content of the audio. In addition, the virtual object may be an object capable of expressing characteristics of audio, such as a sound wave. The virtual object may be alternatively any object related to that audio, such as a text, an animation, a video, a virtual cartoon character. The disclosure is not limited to these examples.

It should be noted that, the virtual object described in the disclosure may be pre-configured, so that the virtual object can be displayed directly when it needs to be presented. Alternatively, the audio may be analyzed to generate the virtual object according to an audio feature, which is not specifically limited in the exemplary embodiment.

According to some embodiments of the disclosure, the first device may send audio data of the audio to the second device, and control the second device to play the audio.

In this case, the first device may directly obtain audio identification information of the audio. It can be understood that when the audio is determined, the audio identification information of the audio may be directly obtained based on the audio. Taking a song as an example, the audio identification information may include, but is not limited to, a song title, an artist name, a release date, etc. Since the audio is sent from the first device to the second device, the first device may obtain the audio identification information locally or from a direct accessible device of the first device.

In addition, there is an association between the audio identification information and the virtual object, and such association may be artificially configured in advance, and the present disclosure does not limit this.

According to some other embodiments of the disclosure, the audio played by the second device does not come from the first device, that is, the second device may play audio stored locally or from network.

In this case, the second device may send audio identification information of the audio to the first device. The first device may determine the virtual object corresponding to the audio based on the relationship between the audio identification information and the virtual object.

In the case that the virtual object corresponding to the audio is stored in the second device, the second device may also directly send the virtual object corresponding to the audio to the first device.

In addition, when the second device plays the audio, the first device may use the sound pickup device (such as a microphone) equipped with the first device to acquire audio data of the audio, and extract an audio feature, such as volume, rhythm, of the audio data. Next, the first device analyzes the audio feature of the audio data, and generates, according to a result of analyzing the audio feature, the virtual object corresponding to the audio.

Taking the virtual object as a wave as an example, an amplitude of up and down vibration of the wave is determined according to a volume of the audio, and a flow rate of the wave is determined according to a rhythm of the audio. Specifically, the higher the volume, the greater the amplitude of up and down vibration of the wave; and the faster the rhythm, the faster the flow rate of the wave. In addition, a simulated large wave may be presented when the volume reaches a certain threshold.

It should be understood that the pose relationship between the virtual object and the second device may be preset. For example, the virtual object is configured to surround the second device, the virtual object is configured to be in front of the second device and inclined at 60°, which is not limited by the disclosure.

As such, when the pose relationship between the virtual object and the second device is determined, the pose of the virtual object in the target coordinate system can be determined based on the pose of the second device in the target coordinate system.

At S38, in response to the second device is playing the audio, displaying, according to the pose of the first device in the target coordinate system and the pose of the virtual object in the target coordinate system, the virtual object on a display interface of the first device.

It can be understood that, after the poses of the first device and the virtual object in the target coordinate system are determined, the virtual object can be displayed on the display interface of the first device.

Further, the disclosure further provides a solution for the collision between a virtual object and a real object.

First, the first device may determine, based on the scene image and the depth image obtained by the first device, a pose of a real object in a scene in the target coordinate system. When it is determined that the pose of the real object in the target coordinate system is overlapped with the pose of the virtual object in the target coordinate system based on the pose of the real object in the target coordinate system and the pose of the virtual object in the target coordinate system, a collision parameter of the real object in an overlapping area and a collision parameter of the virtual object in the overlapping area may be obtained. The collision parameters may be configured by developers during modeling, or alternatively be configured by users when the method is applied, thereby increasing entertainment. In addition, the collision parameters may include, for example, a collision volume, a collision intensity, and a collision attenuation degree, and the disclosure does not limit the collision parameters to these examples.

Then, a virtual collision image may be generated and displayed based on the collision parameter of the real object and the collision parameter of the virtual object. For example, an image of collision effect may be automatically generated by an existing game engine, which is not limited to the disclosure.

Figure 7:
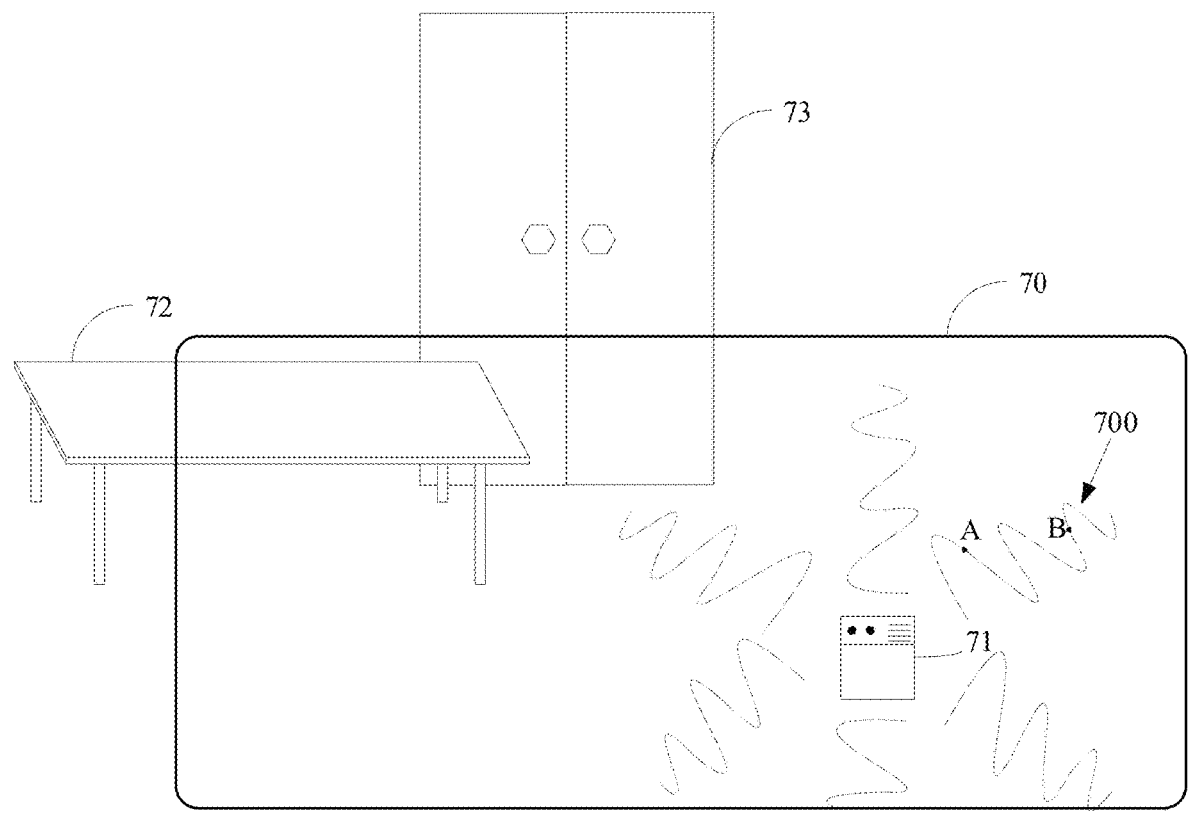
FIG. 7 illustrates a schematic diagram of applying a solution of the disclosure to display a virtual object in a real scene.

An exemplary scenario in which the solution of the disclosure is applied to display a virtual object will be described with reference to FIG. 7.

First, a mobile phone 70 determines its pose in a coordinate system of a mapping device by localization. In addition, a sound equipment 71 obtains a pose of the sound equipment 71 in the world coordinate system through Bluetooth, and sends the pose to the mobile phone 70.

Then, the mobile phone 70 determines the pose of the sound equipment 71 in the coordinate system of the mapping device through a pose transformation relationship between a world coordinate system and the coordinate system of the mapping device, thereby unifying the mobile phone 70 and the sound equipment 71 into the same coordinate system.

The mobile phone 70 may send music to the sound equipment 71 through the Bluetooth or the like, and determine a virtual sound wave corresponding to the music. In addition, when the pose of the sound equipment 71 in the mapping device coordinate system is determined, a pose of the virtual object in the mapping device coordinate system may be determined according to a preset relative pose relationship.

Then, the mobile phone 70 can control the sound equipment 71 to play music, and render the virtual sound wave 700 on the interface of the mobile phone 70 based on the pose of the virtual object in the coordinate system of the mapping device.

Furthermore, different locations (or areas) of the virtual sound wave 700 may be configured with different colors, i.e., a color of a point A may be different from a color of a point B.

Moreover, when the virtual sound wave 700 overlaps with a real cabinet 73 or a real table 72, the aforementioned collision strategy may be applied to display a collision effect on the interface of the mobile phone 70.

In summary, based on the virtual object display method of the exemplary embodiments of the disclosure, on the one hand, the disclosure combines the AR technology to configure the virtual object corresponding to the audio on the display interface of the first device, which can realize sound visualization; on the other hand, in some technologies that use a motion of a real object to express sound, given that the real objects is susceptible to the environment, a problem of inaccurate sound expression may occur. Whereas the virtual objects of the solution of the disclosure may be configured by computer technology, the virtual object configured by the computer avoid environmental interference, thereby reflecting content conveyed by the sound accurately and improving the expression effect of sound visualization. In addition, since the solution for sound visualization in the disclosure does not require other real objects to realize, a cost of realizing sound visualization is greatly reduced. On the other hand, the disclosure does not require other real objects to realize, which greatly reduces the cost of realizing sound visualization. Furthermore, the solution for sound visualization in the disclosure is realized by a computer algorithm and has strong versatility.

It should be noted that, although each operation of the method in the present disclosure is shown in the accompanying drawings in a particular order, but it is not required or implied that, these operations must be performed in that particular order or that all of the operations listed must be performed to achieve a desired result. Additionally or alternatively, certain operations may be omitted, multiple operations may be combined into a single operation, and/or a single operation may be split into multiple operations to perform, etc.

Further, a virtual object display apparatus may also be provided according to some embodiments of the disclosure.

Figure 8:
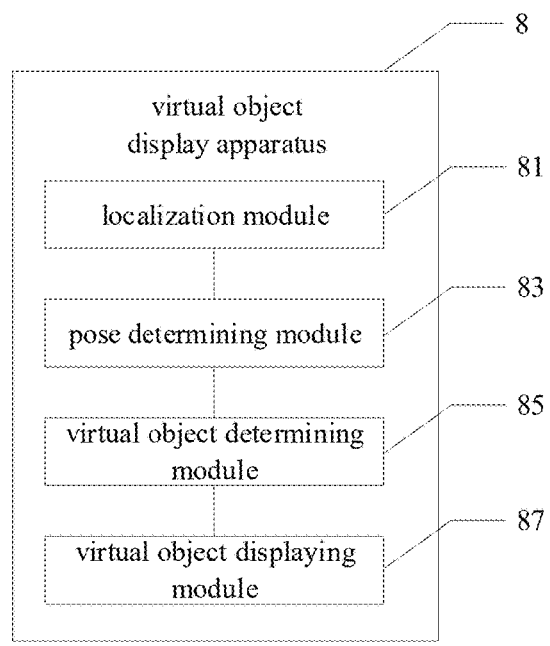
FIG. 8 illustrates a schematic block diagram of a virtual object display apparatus according to some exemplary embodiments of the disclosure.

FIG. 8 illustrates a block diagram of a virtual object display apparatus applied to the first device according to some exemplary embodiments of the disclosure. As illustrated in FIG. 8, the virtual object display apparatus applied to the first device according to the exemplary embodiments of the disclosure may include a localization module 81, a pose determining module 83, a virtual object determining module 85 and a virtual object displaying module 87.

Specifically, the localization module 81 may be configured to perform localization on the first device to thereby determine a pose of the first device in a target coordinate system. The pose determining module 83 may be configured to determine a pose of a second device in the target coordinate system, wherein the second device is configured to play audio. The virtual object determining module 85 may be configured to determine a virtual object corresponding to the audio, and determine, based on the pose of the second device in the target coordinate system, a pose of the virtual object in the target coordinate system. The virtual object displaying module 87 may be configured to in response to the second device is playing the audio, display, according to the pose of the first device in the target coordinate system and the pose of the virtual object in the target coordinate system, the virtual object on the display interface of the first device.

According to the exemplary embodiments of the disclosure, the pose determining module 83 may configured to: obtain a pose of the second device in a coordinate system of the second device; and transform, based on a pose transformation relationship between the target coordinate system and the coordinate system of the second device, the pose of the second device in the coordinate system of the second device into the pose of the second device in the target coordinate system.

According to the exemplary embodiments of the disclosure, the pose of the second device in the coordinate system of the second device is determined by applying a method based on Bluetooth localization or Wi-Fi localization on the second device.

Figure 9:
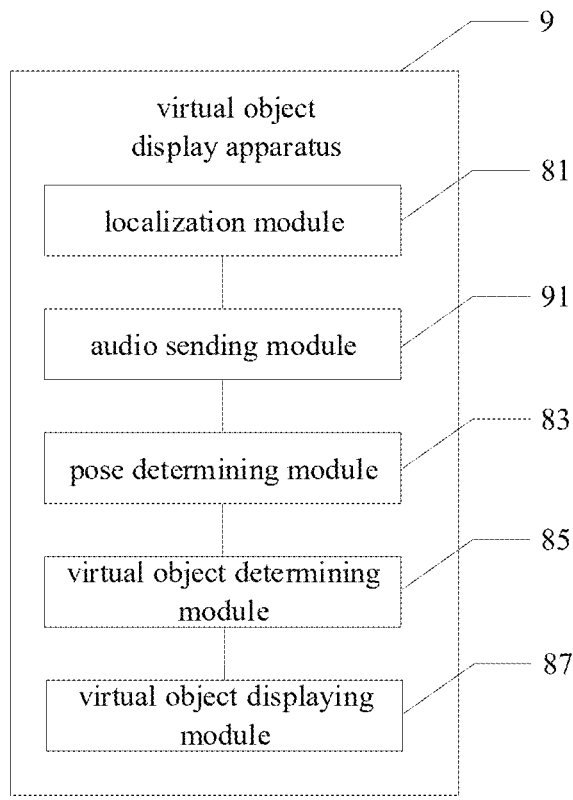
FIG. 9 illustrates another schematic block diagram of the virtual object display apparatus according to some exemplary embodiments of the disclosure.

According to some exemplary embodiments of the disclosure, as illustrated in FIG. 9, the virtual object display device 9 may further include an audio sending module 91 compared to the virtual object display device 8.

Specifically, the audio sending module 91 is configured to send audio data of the audio to the second device and control the second device to play the audio.

According to some exemplary embodiments of the disclosure, when determining, based on the relationship between the audio identification information and the virtual object, the virtual object corresponding to the audio, the virtual object determining module 85 may be specifically configured to obtain, based on the audio, audio identification information of the audio; and determine, based on a relationship between the audio identification information and the virtual object, the virtual object corresponding to the audio.

According to some exemplary embodiments of the disclosure, when determining the virtual object corresponding to the audio, the virtual object determining module 85 may be specifically configured to receive audio identification information of the audio sent by the second device; and determine, based on a relationship between the audio identification information and the virtual object, the virtual object corresponding to the audio.

According to some exemplary embodiments of the disclosure, when determining the virtual object corresponding to the audio, the virtual object determining module 85 may be specifically configured to receive audio identification information of the audio sent by the second device; and determine, based on a relationship between the audio identification information and the virtual object, the virtual object corresponding to the audio.

According to some exemplary embodiments of the disclosure, when determining the virtual object corresponding to the audio, the virtual object determining module 85 may be specifically configured to obtain, by a sound pickup device of the first device, audio data of the audio; extract an audio feature of the audio data; and analyze the audio feature of the audio data and generate, according to a result of analyzing the audio feature, the virtual object corresponding to the audio.

Figure 10:
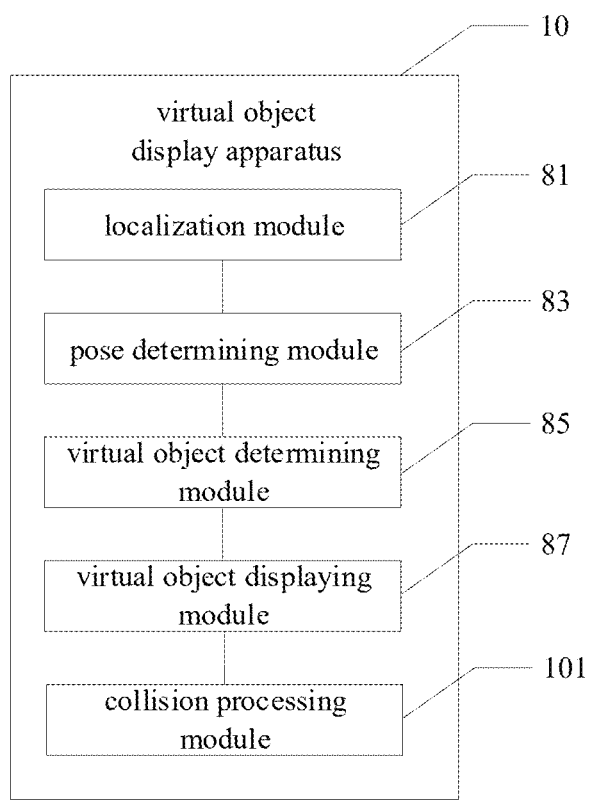
FIG. 10 illustrates still another schematic block diagram of the virtual object display apparatus according to some exemplary embodiments of the disclosure.

According to some exemplary embodiments of the disclosure, as illustrated in FIG. 10, the virtual object display device 9 may further include a collision processing module 101 compared to the virtual object display device 8.

Specifically, the collision processing module 101 may be configured to obtain, in response to the pose of the real object in the target coordinate system is overlapped with the pose of the virtual object in the target coordinate system, a collision parameter of the real object in an overlapping area and a collision parameter of the virtual object in the overlapping area; and generate and display a virtual collision image, based on the collision parameter of the real object and the collision parameter of the virtual object.

According to some exemplary embodiments of the disclosure, the target coordinate system is a coordinate system of map construction of a mapping device. In this case, the localization module 81 may be configured to obtain a current frame and depth information corresponding to the current frame to thereby obtain feature point information of the current frame; calculate, based on the feature point information of the current frame and feature point information of a keyframe in a keyframe set of map construction, a pose transformation relationship between a coordinate system of the first device and the coordinate system of the mapping device; obtain the pose of the first device in the coordinate system of the first device; and transform, based on the pose transformation relationship, the pose of the first device in the coordinate system of the first device into the pose of the first device in the target coordinate system.

Figure 11:
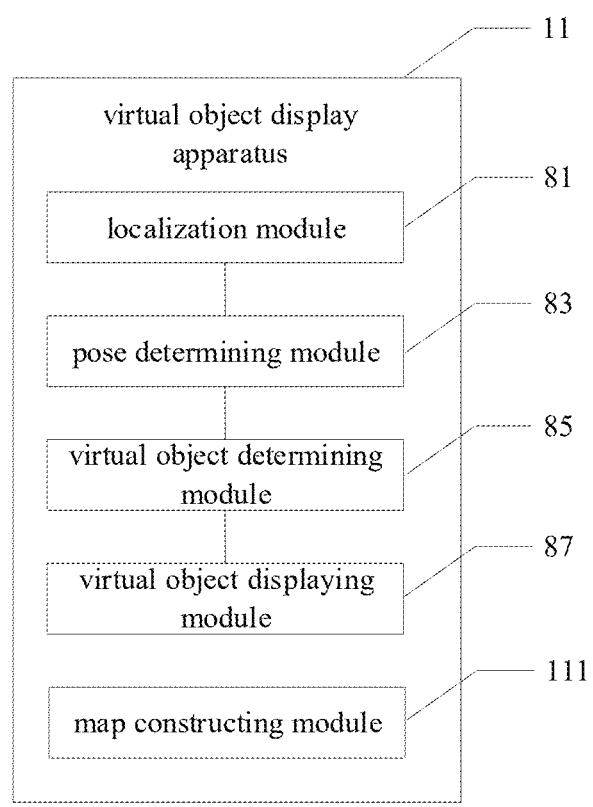
FIG. 11 illustrates even still another schematic block diagram of the virtual object display apparatus according to some exemplary embodiments of the disclosure.

According to some exemplary embodiments of the disclosure, the first device is the mapping device. In this case, as illustrated in FIG. 11, the virtual object display apparatus 11 may further include a map constructing module 111 compared to the virtual object display device 8.

Specifically, the map constructing module 111 may be further configured to obtain a scene image and depth information corresponding to the scene image in advance; and construct the map based on the scene image and the depth information corresponding to the scene image.

According to some exemplary embodiments of the disclosure, the map constructing module 111 may be configured to perform feature extraction on the scene image to obtain feature information; perform, based on the feature information, visual tracking and motion estimation to obtain an intermediate result; obtain local point cloud data based on the depth information corresponding to the scene image and a camera intrinsic parameter of the first device; generate global point cloud data based on the intermediate result and the local point cloud data; and construct the map based on the global point cloud data.

Since the various functional modules of the virtual object display apparatus of the embodiments of the disclosure are the same as those in the method embodiments described above, details will not be repeated here.

By the above description of the embodiments, those skilled in the art will readily understand that, the exemplary embodiments described herein may be implemented by means of software, or by means of software in combination with necessary hardware. Therefore, the technical solutions of the embodiments of the disclosure may be implemented in the form of a software product. The software product may be stored in a non-volatile storage medium (which may be a compact disc read-only memory (CD-ROM), a USB flash drive, a removable hard disk, or the like) or in a network. The software product includes several instructions for instructing a computer device (which may be a personal computer, a server, a terminal device, a network device, or the like) to perform the methods according to the embodiments of the disclosure.

Further, the above-mentioned accompanying drawings are merely schematic illustrations of the processing included in the method according to exemplary embodiments of the disclosure, and are not intended for limitation. It should be easily understood that, the processing shown in the above-mentioned accompanying drawings does not indicate or limit the time or temporal sequence of such processing. It should also be easily understood that, the processing may for example be performed in multiple modules either synchronously or asynchronously.

It should be noted that, although several modules or units of the device for executing actions are mentioned in the above detailed description, this kind of division is not mandatory. In fact, according to some embodiments of the disclosure, the features and functions of two or more modules or units described above may be embodied in a single module or unit. Conversely, the feature and function of one module or unit described above may be further divided to be embodied by a plurality of modules or units. Other embodiments of the disclosure will readily occur to the minds of those skilled in the art upon review of the specification and practice of what is disclosed herein.

the disclosure may be intended to cover any variations, applications or adaptive changes of the disclosure. These variations, applications or adaptive changes may follow the general principle of the disclosure and include well known knowledge or customary technical schemes in the art that are not disclosed herein. The specification and embodiments should merely be considered as exemplary, and the true scope and spirit of the disclosure is indicated by the claims.

It should be understood that, the disclosure is not limited to the precise structure already described above and illustrated in the accompanying drawings, but various modifications and changes may be made without departing from the scope of the disclosure. The scope of the disclosure is only defined by the appended claim set.

What is claimed is:

1. A virtual object display method, implemented by a first device, comprising:
    performing localization on the first device to determine a pose of the first device in a target coordinate system;
    determining a pose of a second device in the target coordinate system, wherein the second device is configured to play audio;
    determining a virtual object corresponding to the audio, and determining, based on the pose of the second device in the target coordinate system, a pose of the virtual object in the target coordinate system; and
    in response to the second device is playing the audio, displaying, according to the pose of the first device in the target coordinate system and the pose of the virtual object in the target coordinate system, the virtual object on a display interface of the first device;
    wherein the target coordinate system is a coordinate system of map construction of a mapping device;
    wherein performing localization on the first device to determine the pose of the first device in the target coordinate system, comprises:
        obtaining a current frame and depth information corresponding to the current frame to obtain feature point information of the current frame;
        calculating, based on the feature point information of the current frame and feature point information of a keyframe in a keyframe set of map construction, a pose transformation relationship between a coordinate system of the first device and the coordinate system of the mapping device;
        obtaining the pose of the first device in the coordinate system of the first device; and
        transforming, based on the pose transformation relationship, the pose of the first device in the coordinate system of the first device into the pose of the first device in the target coordinate system.

2. The virtual object display method as claimed in claim 1, wherein determining the pose of the second device in the target coordinate system, comprises:
    obtaining a pose of the second device in a coordinate system of the second device; and
    transforming, based on a pose transformation relationship between the target coordinate system and the coordinate system of the second device, the pose of the second device in the coordinate system of the second device into the pose of the second device in the target coordinate system.

3. The virtual object display method as claimed in claim 2, wherein the pose of the second device in the coordinate system of the second device is determined based on Bluetooth localization or Wi-Fi localization by the second device.

4. The virtual object display method as claimed in claim 2, further comprising:
    selecting a plurality of marker points, and determining positions of the plurality of marker points in the target coordinate system and the coordinate system of the second device; and
    performing coordinate alignment based on a corresponding relationship between positions of the plurality of marker points in the target coordinate system and the coordinate system of the second device, and obtaining the pose transformation relationship between the target coordinate system and the coordinate system of the second device.

5. The virtual object display method as claimed in claim 1, further comprising:
    sending audio data of the audio to the second device, and controlling the second device to play the audio.

6. The virtual object display method as claimed in claim 5, wherein determining the virtual object corresponding to the audio, comprises:
    obtaining, based on the audio, audio identification information of the audio; and
    determining, based on a relationship between the audio identification information and the virtual object, the virtual object corresponding to the audio.

7. The virtual object display method as claimed in claim 1, wherein determining the virtual object corresponding to the audio, comprises:
    receiving audio identification information of the audio sent by the second device; and
    determining, based on a relationship between the audio identification information and the virtual object, the virtual object corresponding to the audio.

8. The virtual object display method as claimed in claim 1, wherein determining the virtual object corresponding to the audio, comprises:
    receiving the virtual object corresponding to the audio sent by the second device.

9. The virtual object display method as claimed in claim 1, wherein determining the virtual object corresponding to the audio, comprises:
    obtaining, by a sound pickup device of the first device, audio data of the audio;
    extracting an audio feature of the audio data; and
    analyzing the audio feature of the audio data, and generating, according to a result of analyzing the audio feature, the virtual object corresponding to the audio.

10. The virtual object display method as claimed in claim 1, further comprising:
    determining a pose of a real object in the target coordinate system, wherein the real object is in a scene;
    obtaining, in response to the pose of the real object in the target coordinate system overlapping with the pose of the virtual object in the target coordinate system, a collision parameter of the real object in an overlapping area and a collision parameter of the virtual object in the overlapping area; and generating and displaying a virtual collision image, based on the collision parameter of the real object and the collision parameter of the virtual object.

11. The virtual object display method as claimed in claim 1, wherein the first device is the mapping device, and the virtual object display method further comprises:
obtaining a scene image and depth information corresponding to the scene image in advance; and
constructing a map based on the scene image and the depth information corresponding to the scene image.

12. The virtual object display method as claimed in claim 11, wherein constructing the map based on the scene image and the depth information corresponding to the scene image, comprises:
performing feature extraction on the scene image to obtain feature information;
performing, based on the feature information, visual tracking and motion estimation to obtain an intermediate result;
obtaining local point cloud data based on the depth information corresponding to the scene image and camera intrinsic parameters of the first device;
generating global point cloud data based on the intermediate result and the local point cloud data; and
constructing the map based on the global point cloud data.

13. The virtual object display method as claimed in claim 12, wherein performing feature extraction on the scene image to obtain feature information, comprises:
combining a feature extraction algorithm and a feature descriptor algorithm to determine a feature extraction mode; and
performing, based on the feature extraction mode, the feature extraction on the scene image to obtain the feature information.

14. The virtual object display method as claimed in claim 1, wherein the pose transformation relationship between the coordinate system of the first device and the coordinate system of the mapping device is calculated by using an iterative closest point algorithm.

15. The virtual object display method as claimed in claim 1, wherein determining the pose of the second device in the target coordinate system, comprises:
obtaining an image containing the second device and depth information of the second device relative to the first device; and
analyzing the image and the distance information combined with the pose of the first device in the target coordinate system to determine the pose of the second device in the target coordinate system.

16. The virtual object display method as claimed in claim 1, wherein the virtual object is a wave spreading around the second device with the second device as a center, an amplitude of up and down vibration of the wave is determined according to a volume of the audio, and a flow rate of the wave is determined according to a rhythm of the audio.

17. A non-transitory computer readable storage medium stored with a computer program, wherein the computer program is configured to be executed by a processor to:
perform localization on a first device to determine a pose of the first device in a target coordinate system;
determine a pose of a second device in the target coordinate system, wherein the second device is configured to play audio;
determine a virtual object corresponding to the audio, and determining, based on the pose of the second device in the target coordinate system, a pose of the virtual object in the target coordinate system; and
display, according to the pose of the first device in the target coordinate system and the pose of the virtual object in the target coordinate system, the virtual object in an augmented reality environment on a display interface of the first device when the second device is playing the audio;
wherein the target coordinate system is a coordinate system of map construction of a mapping device;
wherein the computer program is further configured to be executed by the processor to:
obtain a current frame and depth information corresponding to the current frame to obtain feature point information of the current frame;
calculate, based on the feature point information of the current frame and feature point information of a keyframe in a keyframe set of map construction, a pose transformation relationship between a coordinate system of the first device and the coordinate system of the mapping device;
obtain the pose of the first device in the coordinate system of the first device; and
transform, based on the pose transformation relationship, the pose of the first device in the coordinate system of the first device into the pose of the first device in the target coordinate system.

18. An electronic device, comprising:
a processor; and
a memory, configured to store one or more programs, wherein the one or more programs are configured to, when executed by the processor, cause the processor to:
determine a pose of the electronic device and a pose of a second device in a target coordinate system, wherein the second device is configured to play audio;
determine a virtual object corresponding to the audio, and determining, based on the pose of the second device in the target coordinate system, a pose of the virtual object in the target coordinate system; and
in response to the second device playing the audio, display, according to the pose of the electronic device in the target coordinate system and the pose of the virtual object in the target coordinate system, the virtual object on a display interface of the electronic device;
wherein the target coordinate system is a coordinate system of map construction of a mapping device;
wherein the one or more programs are further configured to cause the processor to:
obtain a current frame and depth information corresponding to the current frame to obtain feature point information of the current frame;
calculate, based on the feature point information of the current frame and feature point information of a keyframe in a keyframe set of map construction, a pose transformation relationship between a coordinate system of the first device and the coordinate system of the mapping device;
obtain the pose of the first device in the coordinate system of the first device; and
transform, based on the pose transformation relationship, the pose of the first device in the coordinate system of the first device into the pose of the first device in the target coordinate system.

19. The electronic device as claimed in claim 18, wherein the processor is further configured to:
obtain, based on the audio, audio identification information of the audio; and determine, based on a relationship between the audio identification information and the virtual object, the virtual object corresponding to the audio.

20. The electronic device as claimed in claim 18, wherein the first device is the mapping device, and the processor is further configured to cause the processor to:
obtain a scene image and depth information corresponding to the scene image in advance;
perform feature extraction on the scene image to obtain feature information;
perform, based on the feature information, visual tracking and motion estimation to obtain an intermediate result;
obtain local point cloud data based on the depth information corresponding to the scene image and camera intrinsic parameters of the first device;
generate global point cloud data based on the intermediate result and the local point cloud data; and
construct a map based on the global point cloud data.

* * * * *